US009111557B2

(12) United States Patent
Gadbois et al.

(10) Patent No.: US 9,111,557 B2
(45) Date of Patent: Aug. 18, 2015

(54) ELECTRICALLY INSULATING MAGNETIC MATERIAL FOR A READ HEAD

(71) Applicant: Seagate Technology LLC, Cupertino, CA (US)

(72) Inventors: Jason Bryce Gadbois, Shakopee, MN (US); Steven A. Mastain, Spring Park, MN (US); James K. Price, Excelsior, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/046,507

(22) Filed: Oct. 4, 2013

(65) Prior Publication Data

US 2015/0098152 A1    Apr. 9, 2015

(51) Int. Cl.
| G11B 5/39 | (2006.01) |
| G11B 5/48 | (2006.01) |
| G11B 5/40 | (2006.01) |
| G11B 5/31 | (2006.01) |

(52) U.S. Cl.
CPC ............ *G11B 5/4853* (2013.01); *G11B 5/3133* (2013.01); *G11B 5/3967* (2013.01); *G11B 5/40* (2013.01)

(58) Field of Classification Search
USPC ......................................... 360/314, 315, 316
See application file for complete search history.

(56) References Cited

U.S. PATENT DOCUMENTS

| 5,079,831 | A | 1/1992 | Reid |
| 5,331,493 | A * | 7/1994 | Schwarz ................... 360/316 |
| 5,335,127 | A * | 8/1994 | Nagata et al. ............. 360/316 |
| 5,508,868 | A | 4/1996 | Cheng et al. |
| 5,798,890 | A * | 8/1998 | Fontana et al. ........... 360/234.5 |
| 6,191,577 | B1 * | 2/2001 | Sasaki et al. ............. 324/207.21 |
| 6,271,998 | B1 * | 8/2001 | Coehoorn et al. ........ 360/324.2 |
| 6,473,275 | B1 * | 10/2002 | Gill .......................... 360/314 |
| 6,717,780 | B2 * | 4/2004 | Hiramoto et al. ......... 360/324.2 |
| 6,785,099 | B2 | 8/2004 | Lee et al. |
| 6,807,032 | B1 | 10/2004 | Seigler et al. |
| 6,842,312 | B1 | 1/2005 | Alstrin et al. |
| 7,760,465 | B2 | 7/2010 | Koeppe |
| 7,911,743 | B2 * | 3/2011 | Hachisuka et al. ........ 360/316 |
| 8,208,228 | B2 * | 6/2012 | Maat et al. ................ 360/314 |
| 8,259,409 | B2 * | 9/2012 | Braganca et al. ......... 360/110 |
| 8,685,757 | B2 * | 4/2014 | Jung et al. ................ 438/3 |
| 8,786,987 | B2 * | 7/2014 | Edelman et al. .......... 360/324.12 |
| 2007/0019335 | A1 * | 1/2007 | McFadyen ............... 360/316 |

* cited by examiner

*Primary Examiner* — Brian Miller
(74) *Attorney, Agent, or Firm* — Hollingsworth Davis, LLC

(57) ABSTRACT

An apparatus such as a magnetic recording head with at least two separately addressable read transducers that are coplanar in a cross track direction. The apparatus includes first coplanar electrical contacts respectively disposed on and in electrical contact with first surfaces of the at least two read transducers and an electrically insulating magnetic material disposed between the electrical contacts.

20 Claims, 7 Drawing Sheets

ELECTRICALLY INSULATING MAGNETIC MATERIAL FOR A READ HEAD

SUMMARY

Some embodiments are directed to devices, methods and systems that can be used with magnetic data storage systems.

In one embodiment, the device comprises an apparatus such as a magnetic recording head with at least two separately addressable read transducers that are coplanar in a cross track direction. The apparatus includes first coplanar electrical contacts respectively disposed on and in electrical contact with first surfaces of the at least two read transducers and an electrically insulating magnetic material disposed between the electrical contacts.

In another embodiment, a system includes two coplanar read transducers, first coplanar contacts, and an electrically insulating magnetic material. The two coplanar read transducers are spaced apart by a gap along a cross track direction. The first coplanar electrical contacts are disposed respectively on and in electrical contact with first surfaces of the at least two read transducers. Each first electrical contact separated from an adjacent first electrical contact in the cross track direction by a gap. The gap between the at least two read transducers is aligned with and has a similar width along the cross track direction as the gap between the first electrical contacts. The electrically insulating magnetic material is disposed in the gap between the read transducers and the gap between the first electrical contacts.

In another embodiment, a method includes forming first and second coplanar read transducers over at least one bottom electrical contact, depositing a first top electrical contact over the first read transducer, depositing electrically insulating magnetic material conformally over the first top electrical contact, removing the insulating magnetic material from the second read transducer, depositing a second top electrical contact over the electrical insulator such that the first and second top electrical contacts are electrically separated from each other by the electrically insulating magnetic material.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure relates generally to the field of magnetic data storage systems. In particular, the present disclosure relates to a magnetic read head with multiple read transducers. Multiple read transducers disposed on the same physical plane in close proximity (such as on adjacent read tracks) offer the potential for increased read data rates and process and design simplification. However, placing the read transducers in such an arrangement creates design and process difficulties due to skew sensitivity and wafer process cost. In particular, the close proximity of the read transducers leaves little room for edge domain stabilization along their shared gap. Additionally, one of the hybrid shield/contact layers must be split along an edge to allow for independent electrical contacts to the readers. The gap created by the split must be precisely aligned with the gap between the read transducers and results in a configuration where the read transducers are placed close to an edge of the shield. Such a configuration creates the potential for degradation in reader resolution due to reduced shielding effectiveness as well as creates a source of shield induced instability.

The present disclosure addresses these concerns by disposing an electrically insulating magnetic material in the gap between the read transducers. Such an arrangement minimizes the magnetic disturbance while preserving electrical isolation. In one embodiment, the electrically insulating magnetic material comprises a ferrite material. In other embodiments, the electrically insulating magnetic material has a coercivity (Hc) less than 100 Oe, a moment of at least 0.25T, and a resistivity of at least 1000 µOhm*cm. In additional embodiments, the multiple read transducers include first and second electrical contacts that are each separated by the electrically insulating magnetic material so as to be configured as magnetic shields to provide both electrical connectivity and magnetic shielding. In some embodiments, the electrical contacts are coplanar.

Embodiments disclosed herein involve an apparatus that includes at least two separately addressable read transducers that are coplanar in a cross track direction. First coplanar electrical contacts are disposed on and are in electrical contact with first surfaces of the read transducers. An electrically insulating magnetic material is disposed between the electrical contacts and is additionally disposed between the two read transducers.

Figure 1:
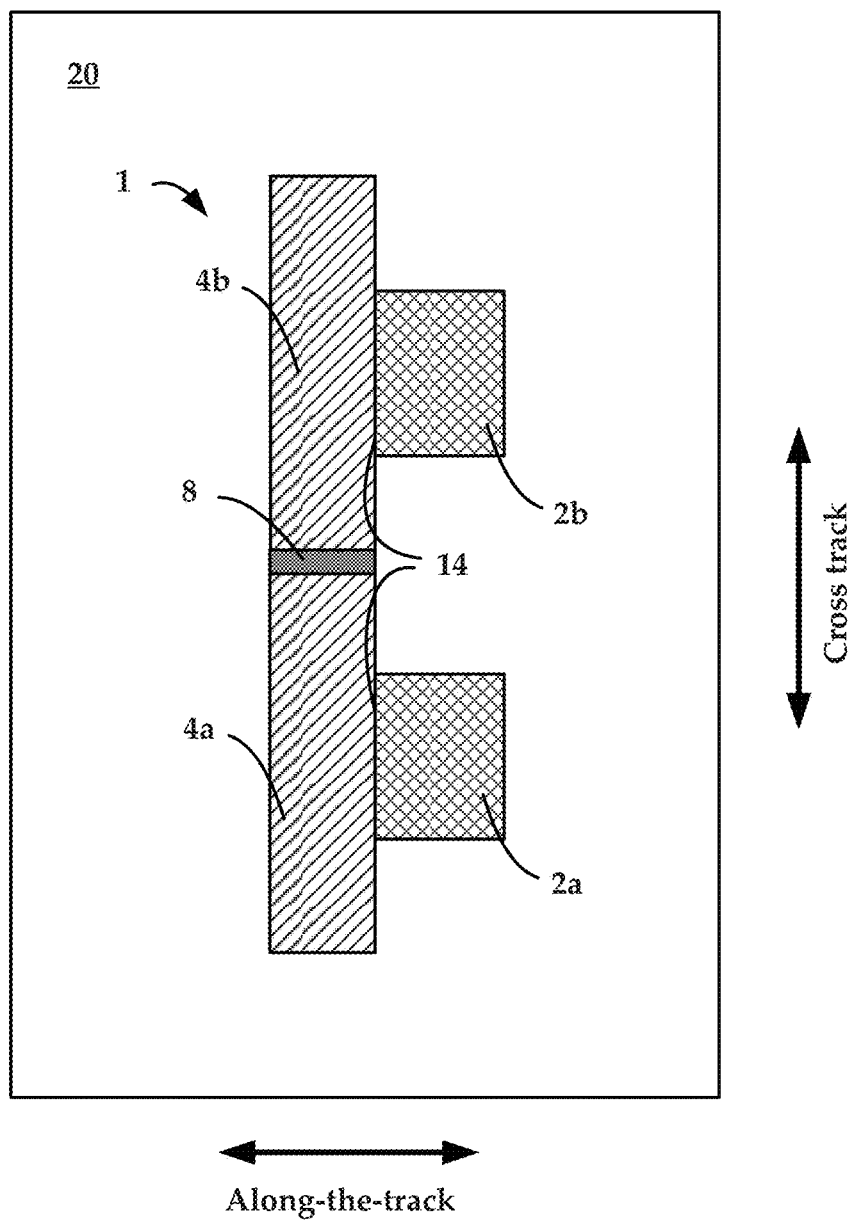
FIG. 1 is a cross-sectional view of a magnetic read head and shields/electrical contacts according to one exemplary embodiment

FIG. 1 shows a simplified cross section of a magnetic read head 1 with first and second read transducers 2a and 2b a first embodiment. Magnetic read head 1 may be disposed next to medium 20 in some arrangements. In some applications, the first and second read transducers 2a and 2b are arranged to read data from adjacent tracks of a medium 20. In the embodiment illustrated in FIG. 1, the first and second read transducers 2a and 2b are separately addressable and arranged coplanar with one another. Additionally, first and second read transducers 2a and 2b are spaced apart along a cross track direction. First coplanar electrical contacts 4a and 4b are respectively disposed on and in electrical contact with first surfaces 14 of the first and second read transducers 2a and 2b. An electrically insulating magnetic material 8 is disposed between the electrical contacts 4a and 4b.

Figure 2:
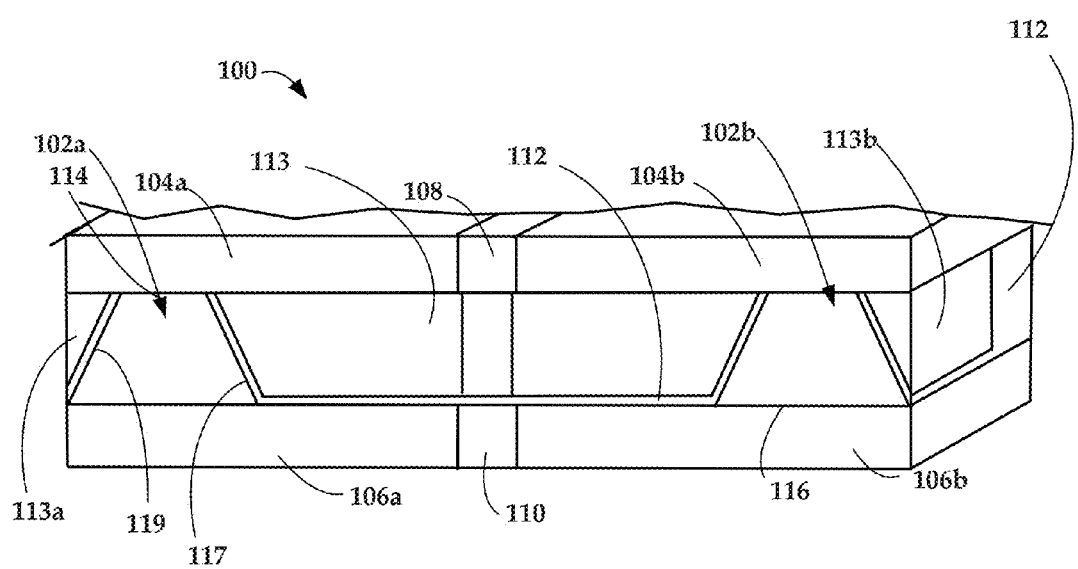
FIG. 2 is a perspective view of a magnetic read head and shields/electrical contacts according to another exemplary embodiment.

FIG. 2 shows a perspective view a magnetic read head 100 with first and second read transducers 102a and 102b according to another exemplary embodiment. Although not shown in FIG. 2, magnetic read head 100 can include additional read transducers as desired.

The magnetic read head 100 additionally includes first and second top contacts 104a and 104b, first and second bottom contacts 106a and 106b, electrically insulating magnetic material 108, and 110. FIG. 2 is viewed from adjacent an ABS additionally showing material 113, 113a and 113b.

The first read transducer 102a is disposed between and is in electrical contact with the first top contact 104a and the first bottom contact 106a. Similarly, the second read transducer 102b is disposed between and is in electrical contact with the second top contact 104b and the second bottom contact 106b. The electrically insulating magnetic material 108 is disposed between and separates the first top contact 104a from the second top contact 104b. Similarly, the electrically insulating magnetic material 110 is disposed between and separates the first bottom contact 106a from the second bottom contact 106b. Insulating magnetic material 112 is disposed along a non-ABS interfacing surface of first and second read transducers 102a and 102b. In general, the electrically insulating magnetic material 108 and 110 is disposed between the first and second read transducers 102a and 102b. In one embodiment, electrically insulating magnetic material 108, 110, and 112 can comprise a ferrite material and/or any material that has a coercivity (Hc) less than 100 Oe, a moment of at least 0.25T, and a resistivity of at least 1000 μOhm*cm.

Referring to FIG. 2, the material 113 is disposed between the first and second read transducers 102a and 102b and is coplanar therewith. The material can be insulating and/or conducting. In some embodiments, the material 113 can be an electrically insulating non-magnetic material 113. In other embodiments, the material 113 can comprise permanent magnets or a conducting side shield material.

As shown in the embodiment of FIG. 2, each read transducer 102a and 102b is located adjacent an air bearing surface (ABS) (not shown) and has a first surface 114 and a second surface 116 (only one of each is shown in FIG. 2) that adjoin the ABS 120 along the cross track direction. In one embodiment, the first and second read transducers 102a and 102b are arranged to read magnetic data from adjacent tracks of a magnetic medium located adjacent thereto. The first top contact 104a is disposed along the first surface 114 of the read transducer 102a and the first bottom contact 106a is disposed along the second surface 116 of the read transducer 102a. In FIG. 2, the first top contact 104a is coplanar with and electrically isolated from the second top contact 104b. Similarly, the first bottom contact 106a is coplanar with and electrically isolated from the second bottom contact 106b. In the embodiment of FIG. 2, the first top contact 104a, the second top contact 104b, the first bottom contact 106a, and the second bottom contact 106b are combined electrical contacts as well as shields and are configured to provide both electrical connectivity and magnetic shielding. As used herein coplanar means that the center-to-center distance between the read transducers 102a and 102b (or other components) in the thickness (downtrack) direction is less than the thickness of either of the read transducers.

The first read transducer 102a extends between the first top contact 104a and the second bottom contact 106a generally in the along-the-track direction in the embodiment of FIG. 2. Similarly, the second read transducer 102b extends between the second top contact 104b and the second bottom contact 106b generally in the along-the-track direction. The first and second top contacts 104a and 104b extend generally in the cross track direction and together form electrically continuous contacts disposed along the first surfaces 114 of both the first read transducer 102a and the second read transducer 102b. The first and second bottom contacts 106a and 106b extend generally in the cross track direction and together form electrically continuous contacts disposed along the second surfaces 116 of both the first read transducer 102a and the second read transducer 102b.

Contacts 104a, 104b, 106a and 106b can be made with magnetically permeable materials, such as nickel, iron, cobalt, or combinations thereof. For example, one material, commonly known as permalloy, consisting of $Ni_{80}Fe_{20}$ can be used in some embodiments. In other embodiments, $Ni_{90}Fe_{10}$ or $Ni_{70}Fe_{30}$ can be used. Additionally, any material that reduces anisotropic magnetoresistance (AMR) effect and is usable for a combination contact/shield can be used. Examples of such materials include Cu, Cr, Mn, Ti, Au, Ag, V, Zr, Nb, Ta, and W.

In one embodiment, the first and second read transducers 102a and 102b utilize read elements 118 that can comprise, for example, a giant magneto-resistive (GMR) read element, a spin valve, or any other type of read element, such as a tunnel magneto-resistive (TMR) read element. Stabilization elements, located adjacent the read elements 118, may be either a permanent magnet or permeable side shield material in some embodiments.

A magnetic storage medium such as a magnetic disk can be used with the magnetic read head 100 in some applications. The magnetic read head 100 can be spaced an appropriate distance from the medium. The medium can include recording layers and may have distinct or continuous magnetically permeable tracks divided into sectors in the cross track direction.

During operation, the medium is passed under the magnetic read head 100 so that the tracks pass under the first and second read transducers 102a and 102b. The sector of the track directly under each of the first and second read transducers 102a and 102b will be read. The magnetic fields within the track directly underneath the first and second read transducers 102a and 102b will be oriented as desired depending upon the read type.

In the exemplary embodiment of FIG. 2, a width of the electrically insulating magnetic material 108 extending between first and second top contacts 104a and 104b is less than a separation distance between the first and second read transducers 102a and 102b. Similarly, a width of the electrically insulating magnetic material 110 extending between first and second bottom contacts 106a and 106b is less than a separation distance between the first and second read transducers 102a and 102b. However, in other embodiments, the widths of the electrically insulating magnetic materials 108 and 110 can be about the same as a separation distance between the first and second read transducers 102a and 102b.

As shown in FIG. 2, each of the first and second read transducers 102a and 102b have an inner edge 117 and an outer edge 119. The material 113 is disposed between inner edges 117 of adjacent first and second read transducers 102a and 102b. Elements 113a and 113b are disposed at one or both outer edges 119. In one embodiment, the elements 113a and 113b comprise permanent magnets. In other embodiments, the elements 113a and 113b comprise magnetic shields. In some embodiments, an insulating layer can be disposed between the outer edge 119 and the magnetic shield.

Figure 3:
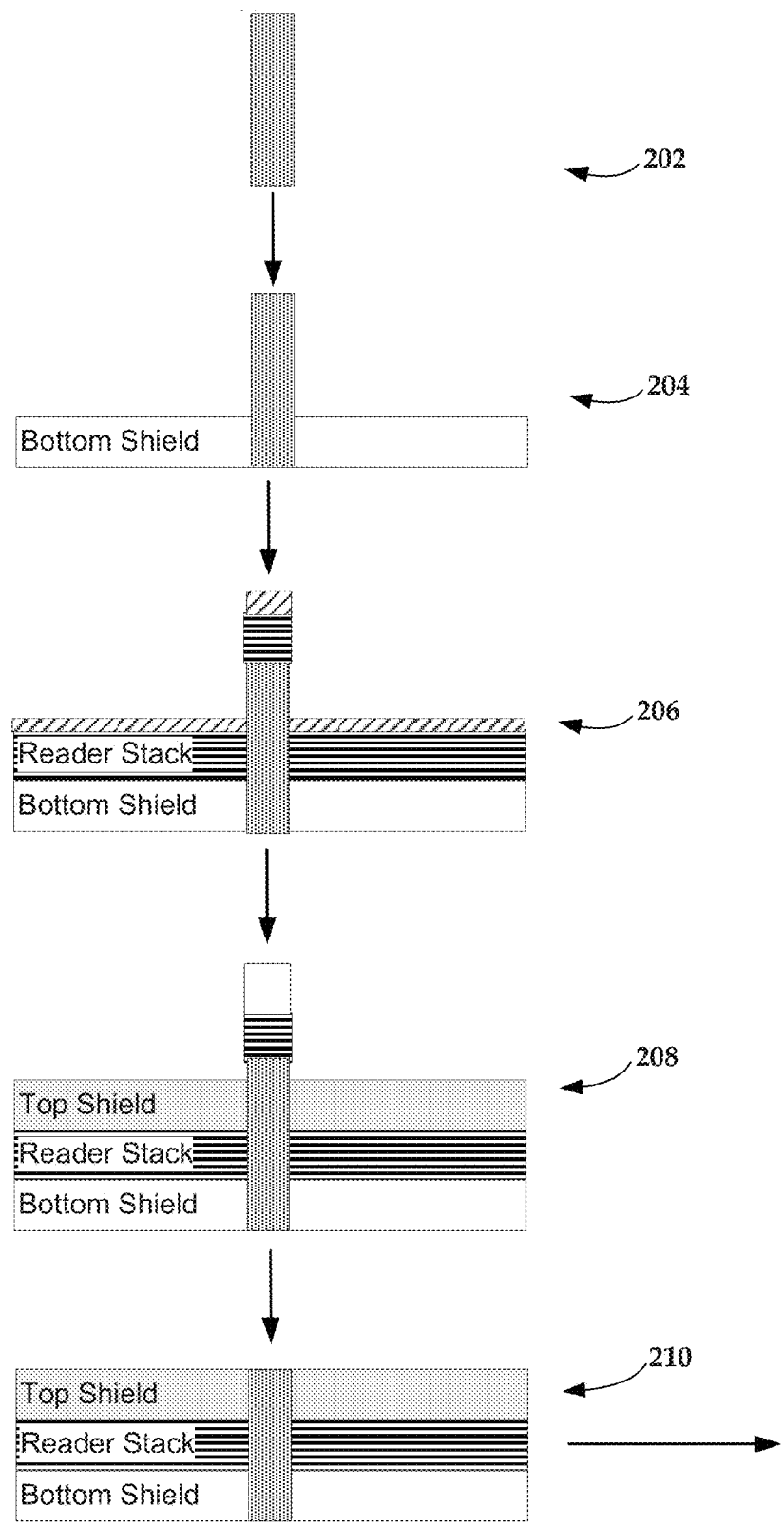
FIGS. 3, 3A, and 3B illustrate one method of fabricating a magnetic read head.
Figure 3A:
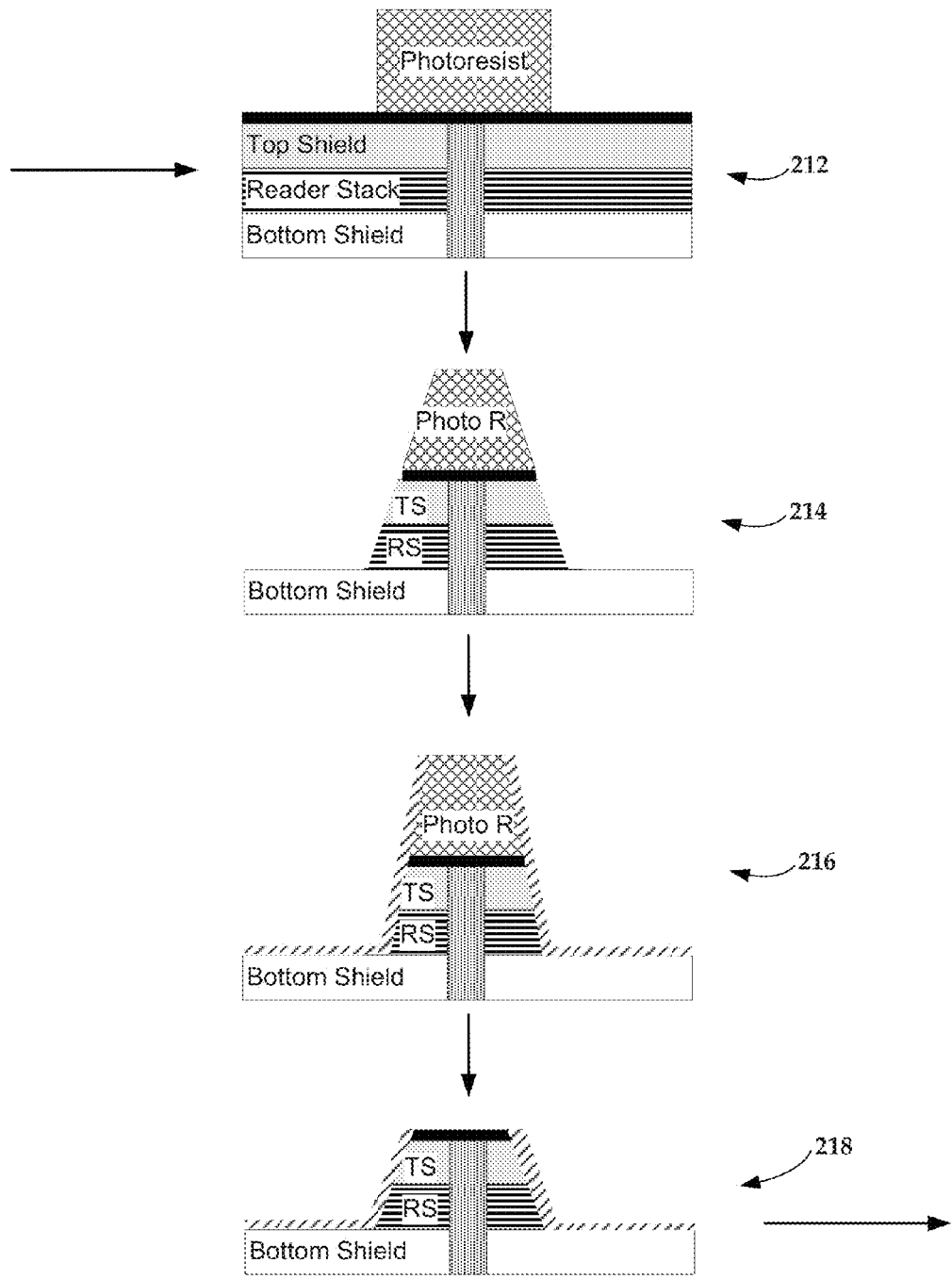
Figure 3B:
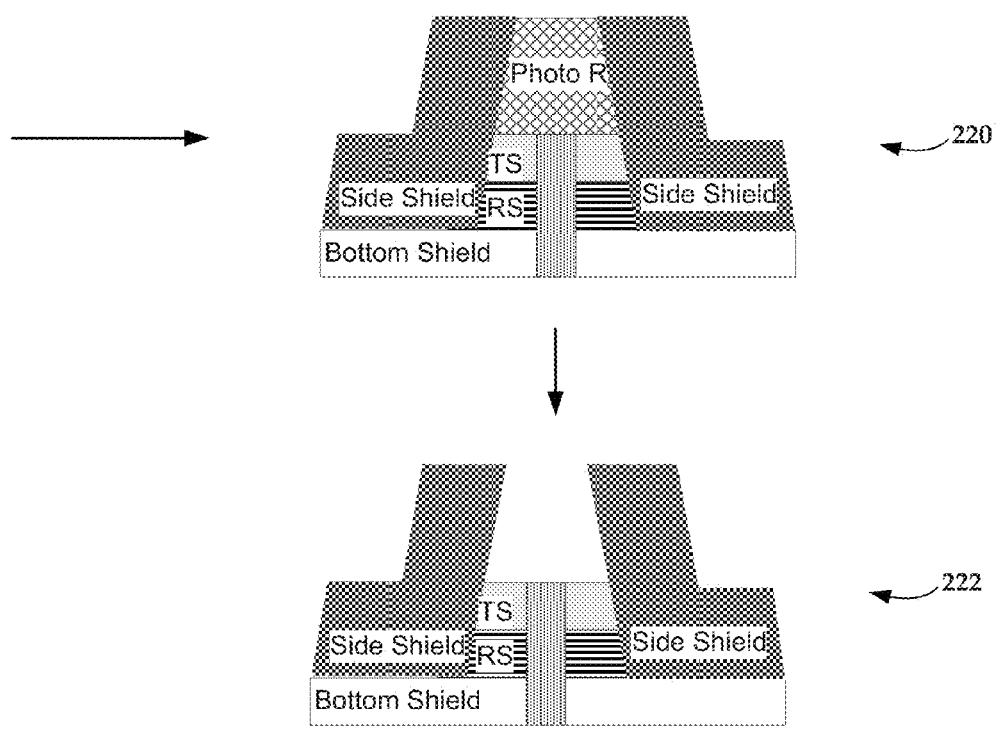

FIGS. 3, 3A, and 3B illustrate a method of forming a magnetic read head according to an exemplary embodiment. In step 202, a patterned magnetic, non-conducting material is formed using, for example, a deposition process. In some embodiments, the patterned magnetic, non-conducting material is a ferrite film. The patterned magnetic, non-conducting material can be sintered to form a spinel structure and pattered using an amorphous carbon mill mask. In step 204, a bottom shield can be formed by plating or another fabrication process. A reader stack material is deposited over the bottom shield in step 206. Additionally, in step 206, a magnetic cap layer can be deposited over the reader stack. Side milling can be performed as desired. Step 208 forms a top shield by plating or another fabrication process. The assembly can use chemical-mechanical planarization or similar process to planarize the ferrite with the top of the top shield in step 210. An amorphous carbon hard mask layer can be deposited over the top shield in step 212. Additionally, step 212 patterns a photoresist over the carbon hard mask layer. Step 214 patterns the carbon layer and machines the reader stacks by milling or similar fabrication technique. Step 216 deposits an insulating layer along the machines surfaces of the bottom shield, reader stack, top shield, and photoresist. In step 218, knockoff milling or a similar process can be performed to remove mask materials. Step 220 deposits a plating seed layer, patterns a photoresist, and forms side-shields by plating or similar fabrication technique. In step 222, the photoresist can be striped leaving the side-shields, top shield, reader stack, bottom shield, and magnetic, non-conducting material.

Figure 4:
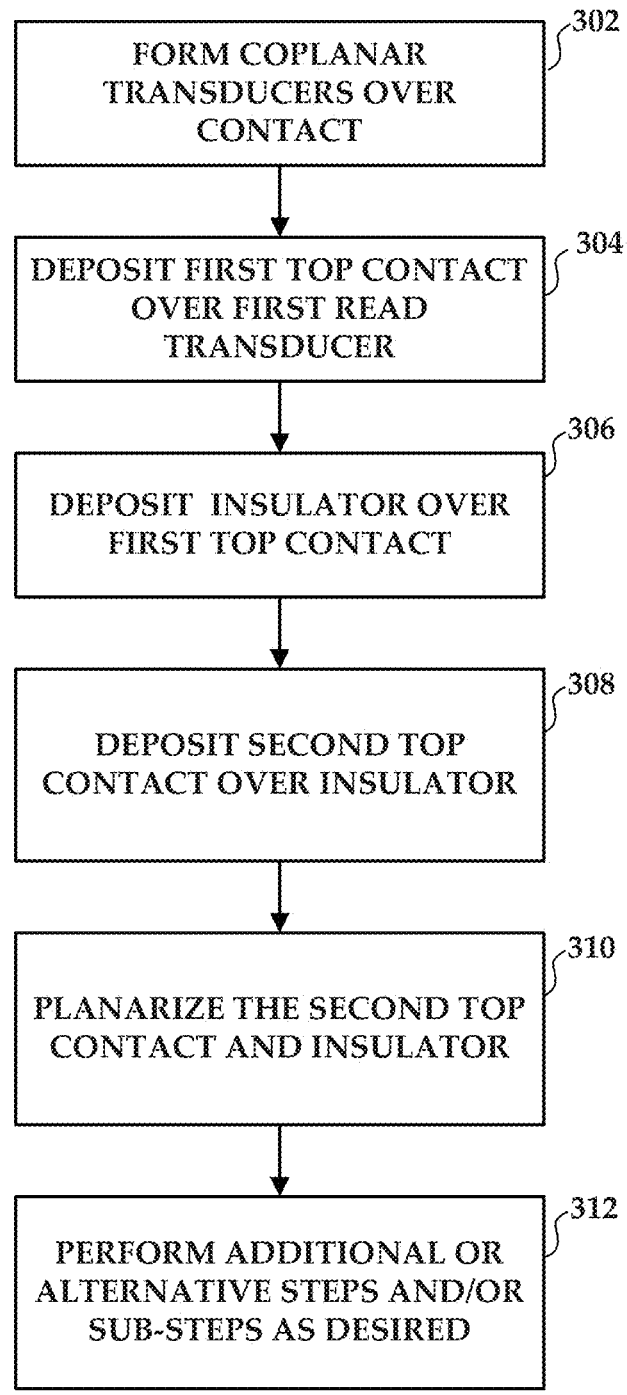
FIG. 4 is a flow diagram of another method of fabricating a magnetic read head.

FIG. 4 shows a flow diagram of another method of forming a magnetic read head. The method includes a step 302 where first and second coplanar read transducers are formed over at least one bottom electrical contact. In step 304, a first top electrical contact is deposited over the first read transducer. The method proceeds from step 304 to step 306 where an electrically insulating magnetic material is deposited conformally over the first top electrical contact. Also in step 306, the second top electrical contact is masked and the electrically insulating magnetic material is removed from the second read transducer. In step 308, a second top electrical contact is deposited over electrically insulating magnetic material such that the first and second top electrical contacts are electrically separated from each other by the electrical insulator. The second top electrical contact and the electrically insulating magnetic material are planarized to form separately addressable first and second electrical contacts in step 310.

The method of FIG. 4 may additionally or alternatively include various steps and/or sub-steps as illustrated by step 312. For example, the deposition of the electrically insulating magnetic material conformally over the first top electrical contact can include depositing the electrically insulating magnetic material conformally over a surface and an edge of the first top electrical contact, where the edge disposed between the first and second read transducers. Additionally or alternatively, deposition of the second top electrical contact over the electrically insulating magnetic material can include depositing the second top electrical contact conformally over the electrically insulating magnetic material. Additionally, forming the at least one bottom electrical contact can include forming separately addressable first and second bottom electrical contacts.

In an alternative embodiment, forming the first and second bottom electrical contacts includes depositing the first bottom electrical contact, depositing an electrically insulating magnetic material conformally over the first bottom electrical contact, removing the insulating magnetic material from the second read transducer, depositing a second bottom electrical contact over the electrically insulating magnetic material such that the first and second bottom electrical contacts are electrically separated from each other by the electrically insulating magnetic material, and planarizing the second bottom electrical contact and the electrically insulating magnetic material to form separately addressable first and second bottom electrical contacts.

In yet another alternative embodiment, the electrical contacts can be formed over the first and second coplanar read transducers. Each read transducer can comprise an air bearing surface (ABS), a first surface adjoining the ABS along the cross track direction, and a second surface adjoining the ABS along the cross track direction in some embodiments. The separately addressable electrical contacts can be formed to be respectively disposed along at least one of the first and second surfaces of the first and second read transducers in some embodiments. In some instances a gap in the cross track direction between the at least two read transducers, a gap in the cross track direction between the first and second bottom electrical contacts, and a gap in the cross track direction between the first and second top electrical contacts have the same or similar width and are aligned in the cross track direction and the electrically insulating magnetic material is disposed in each of the gaps.

The present disclosure relates to a magnetic read head with multiple read transducers. Multiple read transducers disposed on the same physical plane are described. The present disclosure disposes an electrically insulating magnetic material in the gap between the read transducers. Such an arrangement minimizes the magnetic disturbance while preserving electrical isolation. In one embodiment, the electrically insulating magnetic material comprises a ferrite material. In other embodiments, the electrically insulating magnetic material has a coercivity (Hc) less than 100 Oe, a moment of at least 0.25T, and a resistivity of at least 1000 μOhm*cm.

Embodiments disclosed herein involve an apparatus that includes at least two separately addressable read transducers that are coplanar in a cross track direction. First coplanar electrical contacts are disposed on and are in electrical contact with first surfaces of the read transducers. An electrically insulating magnetic material is disposed between the electrical contacts and is additionally disposed between the two read transducers.

Figure 5:
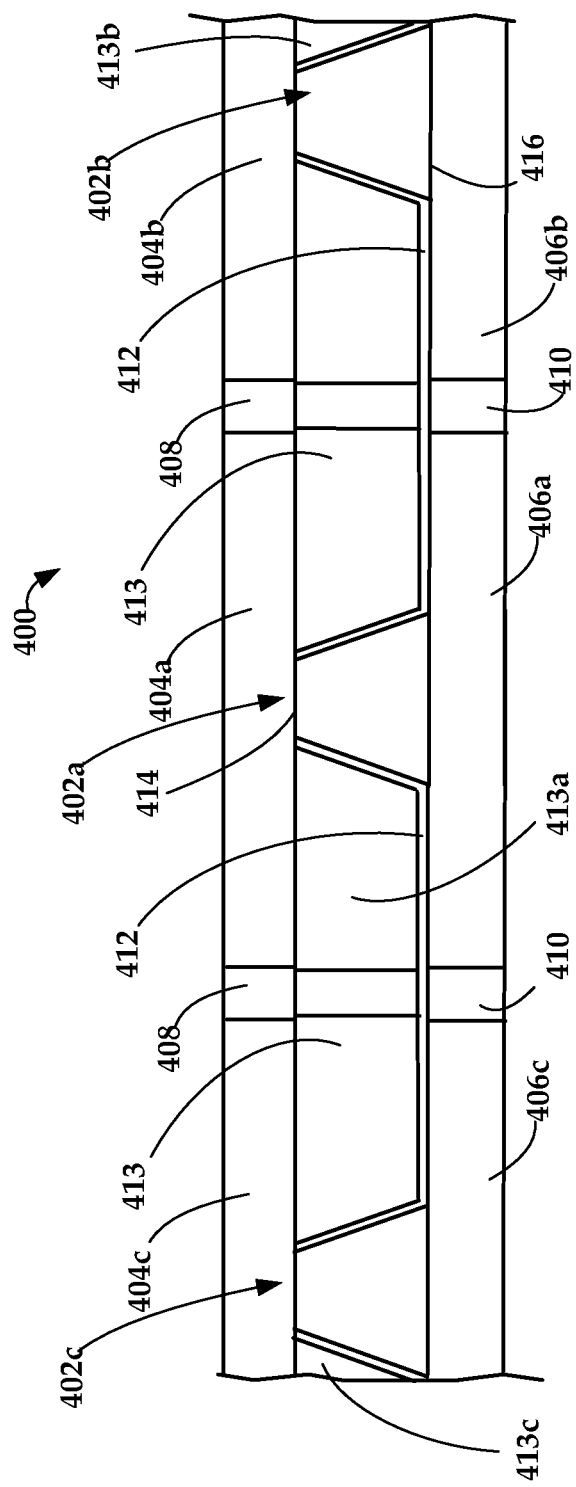
FIG. 5 is a perspective view of a magnetic read head and shields/electrical contacts according to a second exemplary embodiment.

FIG. 5 shows another embodiment of magnetic read head 400 along several surfaces that interface with the ABS. Similar to FIG. 2, FIG. 5 shows first and second read transducers 402a and 402b, first and second top contacts 404a and 404b, first and second bottom contacts 406a and 406b, electrically insulating magnetic material 408, 410, and 412, material 413, first surfaces 414, second surfaces 416, and read elements 418. Additionally, the magnetic read head 400 includes third read transducer 402c, third top contact 404c, third bottom contact 406c, additional electrically insulating magnetic material 408, 410, and 412, and additional material 413 and 413c.

Related assemblies, methods, systems, articles, components, and techniques are also discussed.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:
1. An apparatus comprising:
  at least two separately addressable coplanar read transducers spaced apart along a cross track direction;
  first coplanar electrical contacts respectively disposed on and in electrical contact with first surfaces of the at least two read transducers; and an electrically insulating magnetic material disposed between the electrical contacts.

2. The apparatus of claim 1, wherein the electrically insulating magnetic material is disposed between the at least two read transducers.

3. The apparatus of claim 1, wherein each read transducer has a second surface adjoining an ABS, and further comprising second coplanar electrical contacts respectively disposed on and in electrical contact with the second surfaces of the at least two read transducers.

4. The apparatus of claim 3, wherein the electrically insulating magnetic material is disposed between the second coplanar electrical contacts.

5. The apparatus of claim 1, wherein each read transducer has a second surface adjoining an ABS, and further comprising a second electrically continuous electrical contact disposed on and in electrical contact with the second surfaces of the read transducers.

6. The apparatus of claim 1, wherein the electrically insulating magnetic material comprises a ferrite material.

7. The apparatus of claim 1, wherein an electrically insulating non-magnetic material is disposed between the at least two read transducers.

8. The apparatus of claim 1, wherein the at least two read transducers are arranged to read magnetic data from tracks of a magnetic medium.

9. The apparatus of claim 1, wherein each of the first electrical contacts are combined contacts configured to provide electrical connectivity and magnetic shielding.

10. The apparatus of claim 1, wherein a width of the electrically insulating magnetic material extending between the first electrical contacts is less than a separation distance between the at least two read transducers.

11. The apparatus of claim 1, wherein a width of the electrically insulating magnetic material extending between the first electrical contacts is about the same as a separation distance between the at least two read transducers.

12. The apparatus of claim 1, wherein the at least two read transducers have at least two inner edges and two outer edges, the electrically insulating magnetic material is disposed between inner edges of adjacent pairs of the at least two read transducers and further comprising permanent magnets disposed at one or both outer edges of the at least two read transducers.

13. The apparatus of claim 1, wherein the at least two read transducers have at least two inner edges and two outer edges, the electrically insulating material is disposed between inner edges of adjacent pairs of at least two read elements and further comprising at least one magnetic shield disposed at at least one outer edge of the at least two read elements.

14. The apparatus of claim 13, further comprising an insulating layer disposed between the at least one outer edge and the at least one magnetic shield.

15. The apparatus of claim 1, further comprising a third transducer, a third electrical contact, and a second electrically insulating magnetic material.

16. A system comprising:
two coplanar read transducers spaced apart by a gap along a cross track direction;
first coplanar electrical contacts disposed respectively on and in electrical contact with first surfaces of the at least two read transducers, each first electrical contact separated from an adjacent first electrical contact in the cross track direction by a gap, wherein the gap between the at least two read transducers is aligned with and has a similar width along the cross track direction as the gap between the first electrical contacts; and
an electrically insulating magnetic material disposed in the gap between the read transducers and the gap between the first electrical contacts.

17. The system of claim 16, at least a third read transducer spaced apart by a gap along a cross track direction from the two read transducers and coplanar therewith.

18. The system of claim 17, wherein each second electrical contact is separated from an adjacent second electrical contact by a gap in the cross track direction and the gap between the read transducers is aligned with and has a similar width along the cross track direction as the gap between the second electrical contacts; and
the electrically insulating magnetic material is disposed in the gap between the second electrical contacts.

19. A method comprising:
forming at least two separately addressable coplanar read transducers spaced apart along a cross track direction;
forming first coplanar electrical contacts respectively disposed on and in electrical contact with first surfaces of the at least two read transducers; and
forming an electrically insulating magnetic material disposed between the electrical contacts.

20. The method of claim 19, wherein forming the electrically insulating magnetic material comprises depositing the electrically insulating magnetic material between the at least two read transducers.

* * * * *